US008423590B2

(12) United States Patent
Nichols (10) Patent No.: US 8,423,590 B2
(45) Date of Patent: Apr. 16, 2013

(54) FILE GENERATION FOR TESTING SINGLE-INSTANCE STORAGE ALGORITHM

(75) Inventor: Charles A. Nichols, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 12/790,845

(22) Filed: May 30, 2010

(65) Prior Publication Data
US 2011/0295916 A1    Dec. 1, 2011

(51) Int. Cl.
G06F 12/00    (2006.01)
G06F 17/30    (2006.01)

(52) U.S. Cl.
USPC .......................................... 707/821; 707/822

(58) Field of Classification Search .................. 707/822, 707/821
See application file for complete search history.

(56) References Cited

U.S. PATENT DOCUMENTS

| | | | |
|---|---|---|---|
| 7,046,848 B1* | 5/2006 | Olcott | 382/176 |
| 7,397,715 B2 | 7/2008 | Lim et al. | |
| 7,443,756 B2 | 10/2008 | Lee et al. | |
| 7,454,671 B2 | 11/2008 | Adsitt | |
| 7,519,635 B1 | 4/2009 | Haustein et al. | |
| 7,539,710 B1 | 5/2009 | Haustein et al. | |
| 7,567,188 B1 | 7/2009 | Anglin et al. | |
| 7,786,995 B2* | 8/2010 | Abe et al. | 345/469 |
| 7,796,058 B2* | 9/2010 | Winter | 341/55 |
| 8,212,819 B2* | 7/2012 | Yanagawa | 345/467 |
| 2005/0032095 A1* | 2/2005 | Wigler et al. | 435/6 |
| 2007/0176804 A1* | 8/2007 | Abe et al. | 341/84 |
| 2008/0005201 A1 | 1/2008 | Ting et al. | |
| 2008/0059875 A1* | 3/2008 | Ishizaki et al. | 715/256 |
| 2008/0172652 A1 | 7/2008 | Davia et al. | |
| 2008/0243769 A1 | 10/2008 | Arbour et al. | |
| 2009/0171888 A1 | 7/2009 | Anglin | |
| 2009/0193213 A1* | 7/2009 | Winter | 711/165 |

FOREIGN PATENT DOCUMENTS

JP    2008257716 A    10/2008
WO    2008/147516 A1    12/2008

OTHER PUBLICATIONS

"Users test deduplication limits," Storage Magazine, May 2007.

* cited by examiner

*Primary Examiner* — Merilyn Nguyen
(74) *Attorney, Agent, or Firm* — Feb R. Cabrasawan (57) ABSTRACT

For each section of a buffer, a string of characters is retrieved and reordered to generate a reordered string of characters for the section. Thereafter, for each section of the buffer, the string of characters within the section is copied over with the reordered string of characters for a different section of the buffer. The buffer is then output to a file. If a desired length of the file has not yet been reached, then this process is repeated, or the buffer is again output to the file, based on a desired amount of duplicate data to be included within the file. The resulting file can be used to test a single-instance storage algorithm. The file is thus adapted to mimic a non-artificially generated file in relation to testing a single-instance storage algorithm.

17 Claims, 5 Drawing Sheets

FILE GENERATION FOR TESTING SINGLE-INSTANCE STORAGE ALGORITHM

FIELD OF THE INVENTION

The present invention relates generally to generating a file, and more particularly to generating a file that can be used to test a single-instance storage algorithm.

BACKGROUND OF THE INVENTION

A single-instance storage algorithm maintains one copy of each unique piece of data, where each such unique piece of data may be shared by multiple users, multiple files, or multiple computing devices. As such, data is stored more efficiently, because there is little or no duplication of stored data. A single-instance storage algorithm may also be referred to as a de-duplication algorithm, insofar as duplicate pieces of data within a large collection of data are eliminated.

Single-instance storage is useful in a variety of contexts, including file systems, email server systems, and data backup systems. For example, a data backup system may be used to back up a large collection of data. Rather than blindly copying the large collection of data, the data backup system may employ a single-instance storage algorithm to detect duplicate pieces of data within the collection of data. Each duplicate piece of data is stored just once, to minimize the storage required for the backup.

SUMMARY OF THE INVENTION

A method of an embodiment of the invention includes the following. For each section of a buffer, a string of characters is retrieved from the section by a computing device. The characters within the string of characters are reordered, by the computing device, to generate a reordered string of characters for the section. For each section of the buffer, the string of characters within the section is copied over by the computing device with the reordered string of characters for a different section of the plurality of sections. The buffer is output to a file. The file is adapted to mimic a non-artificially generated file in relation to testing a single-instance storage algorithm. The single-instance storage algorithm is tested using the file.

A system of an embodiment of the invention includes a processor, a computer-readable data storage medium to store a file, a memory including a buffer having a number of sections, and a component and a testing component that are both implemented by the processor to generate the file. The component generates the file by first, for each section of the buffer, retrieving a string of characters from the section, and reordering the characters within the string of characters to generate a reordered string of characters for the section. For each section of the buffer, the component then copies over the string of characters within the section with the reordered string of characters for a different section of the buffer. Finally, the component outputs the buffer to a file. The file is adapted to mimic a non-artificially generated file in relation to testing a single-instance storage algorithm. The testing component is to test the single-instance storage algorithm by using the file.

A computer program product of an embodiment of the invention includes a computer-readable storage medium having computer-readable code embodied therein. The computer-readable code is executable by a computing device. The computer-readable code includes first computer-readable code and second computer-readable code. The first computer-readable code is to, for each section of a buffer, retrieve a string of characters from the section, and reorder the characters within the string of characters to generate a reordered string of characters for the section. The second computer-readable code is to for each section of the plurality of sections of the buffer, copy over the string of characters within the section with the reordered string of characters for a different section of the plurality of sections. The second computer-readable code is then to output the buffer to a file.

BRIEF DESCRIPTION OF THE SEVERAL VIEWS OF THE DRAWINGS

The drawings referenced herein form a part of the specification. Features shown in the drawing are meant as illustrative of only some exemplary embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, single-instance storage algorithms are used to maintain just one copy of each unique piece of data to store a given collection of data more efficiently. To determine how well a single-instance storage algorithm works, the algorithm has to be tested on collections of data. However, obtaining actual real-world collections of data is problematic. Customers of a party that sells single-instance storage systems, for instance, may be unwilling to provide the party with their data, because the data may contain confidential information.

Embodiments of the invention provide for a way by which data used to test a single-instance storage algorithm can be generated. A buffer is populated with sample data. For each section of the buffer, a string of characters is retrieved and reordered to generate a reordered string of characters. Then, for each section, the string of characters is copied over with the reordered string of characters for a different section. The buffer is output to a file that can be used to test single-instance storage algorithms. If a desired length of the file has not yet been reached, the process is repeated, or the buffer is again output to the file.

This process can result in less than a one-percent change in the buffer between successive iterations of the process, but still result in sufficient changes so that the data is unique enough for use in testing a single-instance storage algorithm. The process reorders just a small number of characters within the buffer, and these small changes are then distributed throughout the buffer. The process is thus faster than existing approaches to generate a file used to test single-instance storage algorithms, which generally create or modify all the data used to test-single-instance and therefore are slower. Existing approaches also typically employ some type of random data generation, whereas the inventive process does not generate random data, but instead reorders existing data.

Figure 1:
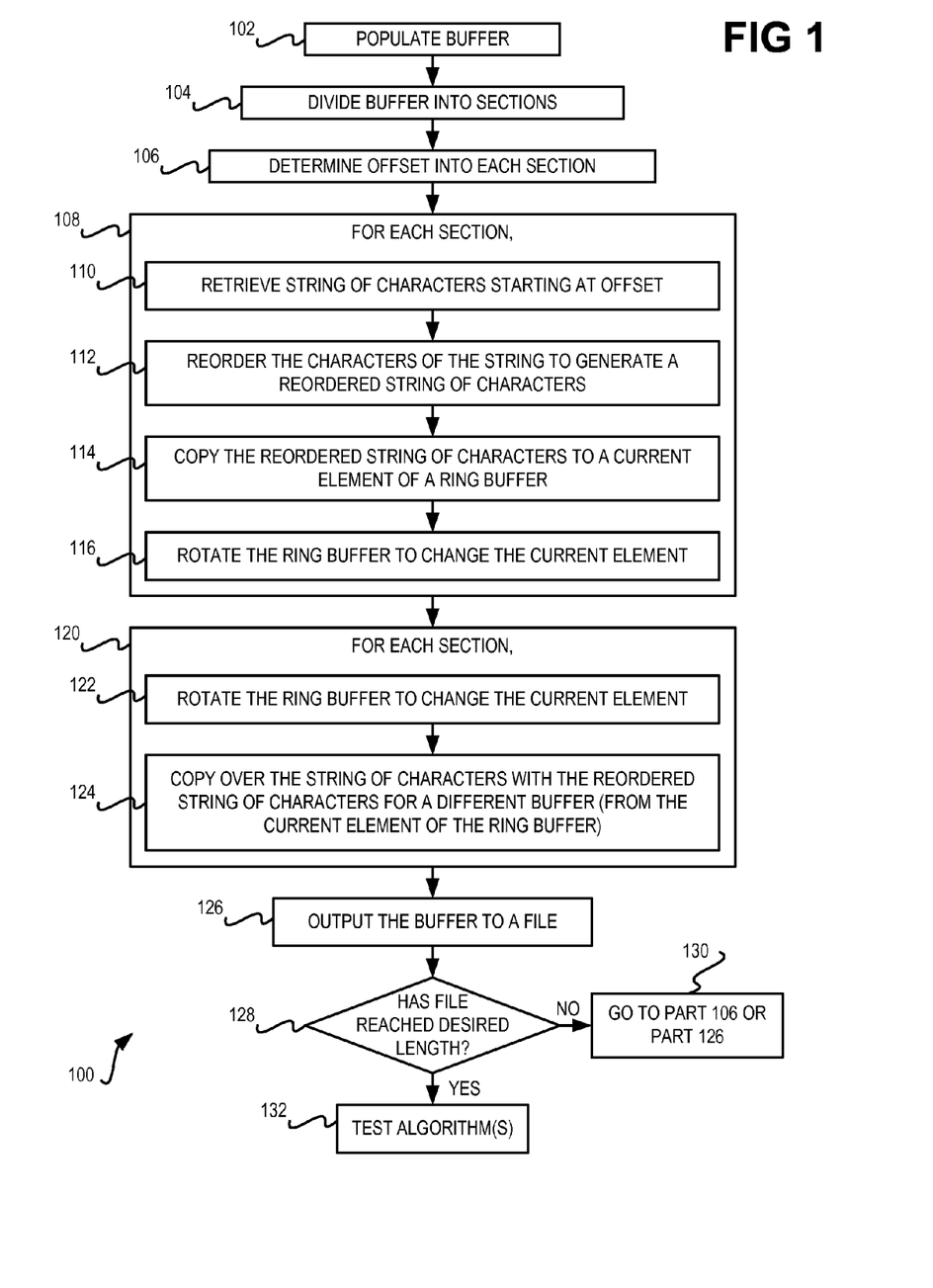
FIG. 1 is a flowchart of a method for generating a file that can be used to test a single-instance storage algorithm, according to an embodiment of the invention.

FIG. 1 shows a method 100 for generating a file that can be used to test a single-instance storage algorithm, according to an embodiment of the invention. A buffer is populated with data (102). The buffer may be populated by filling the buffer with data from a source file. The source file is not the file that is generated by performing the method 100, which can be referred to as a target file. The source file can be any type of file, such as an image file, a text file, and so on. The data that is used to populate the buffer should be non-trivial data. That is, the data should not be all of the same character, and should not have easily discernable patterns within the data. In one embodiment, the size of the buffer is one megabyte.

The buffer is divided into sections (104). The sections can be of the same size. For example, where the buffer is one megabyte in size, there can be one-thousand sections that are each one kilobyte in length.

Figure 2A:
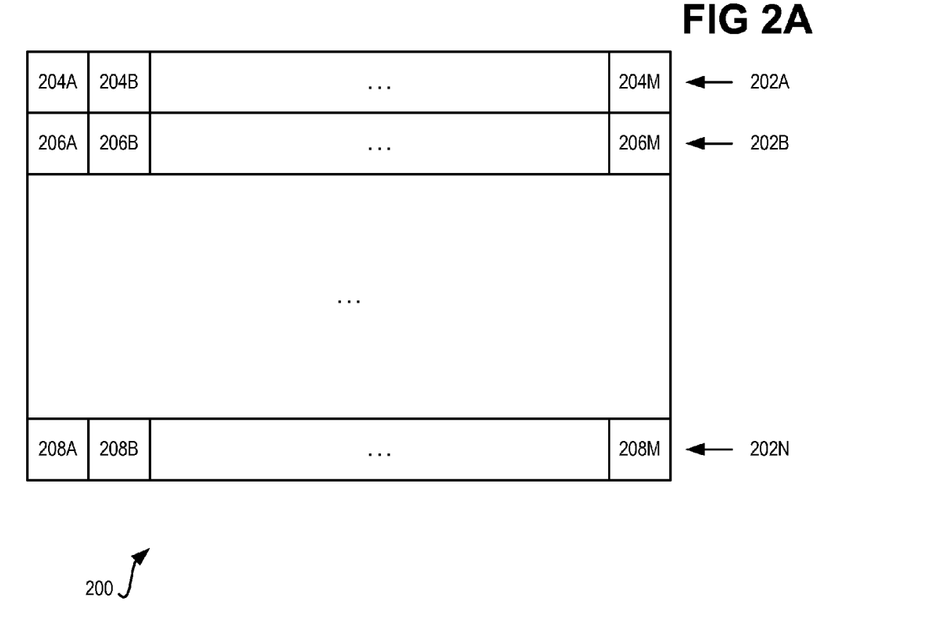
FIGS. 2A, 2B, 2C, 2D, and 2E are diagrams depicting exemplary performance of the method of FIG. 1, according to an embodiment of the invention.

FIG. 2A shows an example buffer 200 after parts 102 and 104 of the method 100 have been performed, according to an embodiment of the invention. The buffer 200 has been divided into n sections 202A, 202B, . . . , 202N, collectively referred to as the sections 202. Each section 202 includes m characters, such as m bytes in an embodiment where each character is one byte in length. In general, a character is defined as one or more bits, where each character has the same number of bits. For the remainder of the detailed description, however, it is assumed that each character is one byte in length, for descriptive convenience.

The section 202A has characters 204A, 204B, . . . , 204M, collectively referred to as the characters 204; the section 202B has characters 206A, 206B, . . . , 206M, collectively referred to as the characters 206; and, the section 202N has characters 208A, 208B, . . . , 208M, collectively referred to as the characters 206. There are thus n×m characters within the buffer 200. The number of sections n can be equal to, less than, or greater than the number of characters m in each section.

Referring back to FIG. 1, an offset is then determined (106). The offset is the same for each section of the buffer. The offset is in relation to each section of the buffer, and specifies where a string of characters from the buffer is to start. For example, if each section is one kilobyte in length, such that the bytes and thus the characters are numbered from 0 to 1,023, and where the string of characters is ten bytes in length, then the offset can be any value between 0 and 1,014.

Therefore, more generally, for a desired string of characters to be referenced that is l characters in length, the offset can be between zero and m−l, where each section includes m characters. This is because each unique string of l characters can be referenced in a given section starting at a different k-th character into the section, where k is the value of the offset and is between zero and m−l. Thus, an offset of zero points to the first character of a section, an offset of one points to the second character of the section, and an offset of m−l points to the last character of the section.

In one embodiment, the offset is determined based on the name and/or location of the file that is being generated by the method 100. The location of the file is the identifier of the storage volume and any directories in which the file is stored, which is commonly referred to as the file's path. A suitable hash can be used to generate the offset based on the name and/or location of the file.

If the hash is capable of providing a value greater than the maximum allowed offset, then the hash may be reduced to yield an offset that is no greater than the maximum allowed offset. For example, the hash may be capable of providing a value between zero and x, but the offset may not be able to be larger than m−1, where m is the number of characters in each section, and where m−1 is less than x. Therefore, the hash may be divided by $$\frac{x}{m-1},$$

and the resulting quotient rounded, to yield the offset.

Figure 2B:
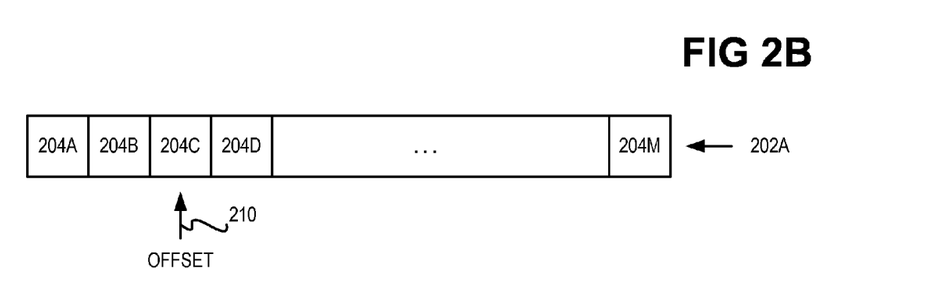

FIG. 2B shows an example offset 210 in relation to the section 202A of the buffer 200 after part 106 of the method 100 has been performed, according to an embodiment of the invention. The section 202A includes m characters 204A, 204B, 204C, 204D, . . . , 204M, where m is greater than or equal to five. The offset 210 has a value of two. The offset 210 thus points to the third character 204C. By comparison, an offset of zero would point to the first character 204A, an offset of one would point to the second character 204B, an offset of three would point to the fourth character 204D, and an offset of m−1 would point to the last character 204M.

Referring back to FIG. 1, the following is performed for each section (108). A string of characters having a predetermined length and starting at the offset that has been determined is retrieved from the section (110). The characters of the string are reordered (112), to generate what is referred to herein as a reordered string of characters. In one embodiment, the string of characters may be reversed in order, such that, for example, the string "ABCD" is reversed to yield the reordered string "DCBA." It is noted that the string of characters retrieved from each section has the same length, and that this length is less than the number of characters in each section.

The reordered string of characters is copied to a current element of a ring buffer (114), which is a different buffer than the buffer that was populated in part 102. The ring buffer has a total of m elements, where m is the number of sections within the buffer. Each element of the ring buffer is l characters in length, where l is the predetermined length of each string of characters. The ring buffer is rotated to change the current element (116), such as by moving the current element to the next element within the ring buffer. It is noted that a ring buffer can also be referred to as a circular buffer or a cyclic buffer, among other phrases.

Figure 2C:
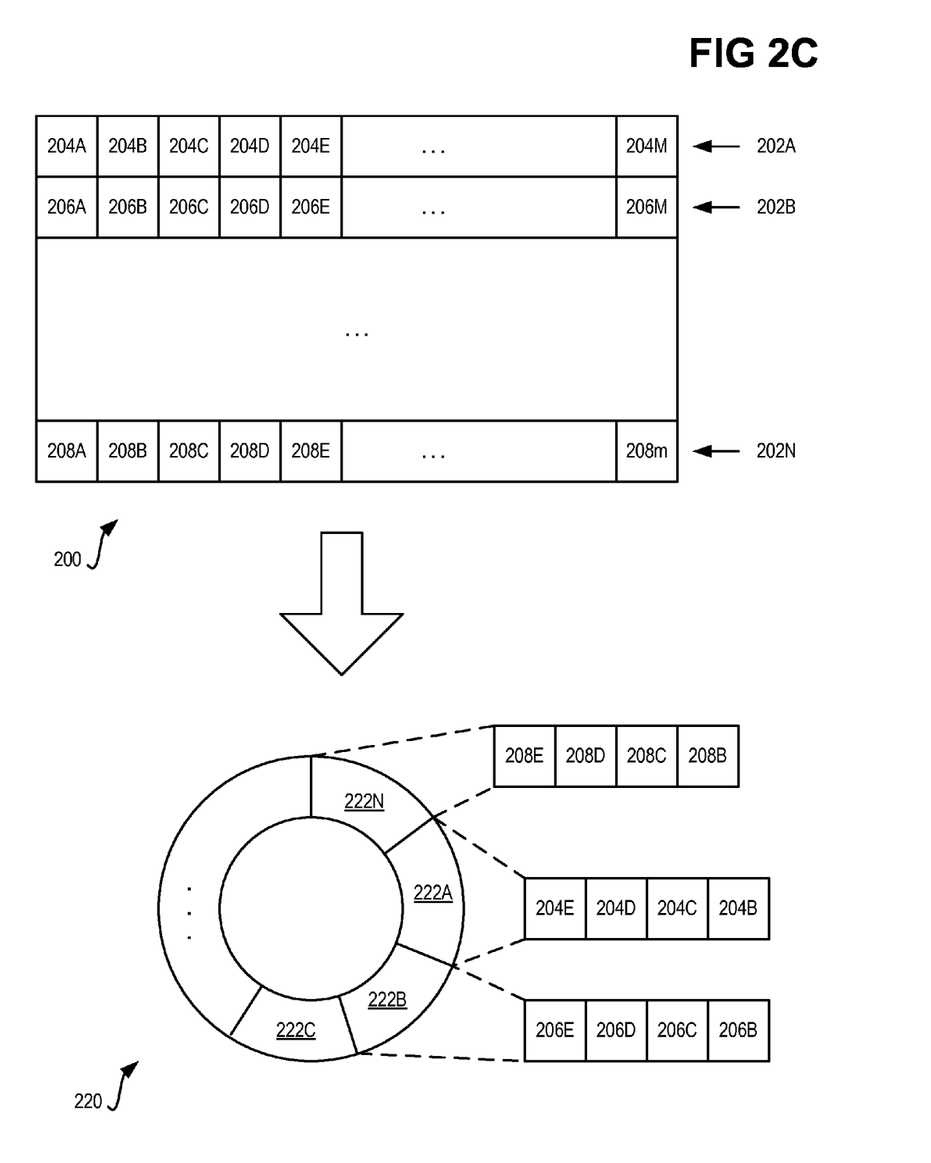

FIG. 2C shows an example ring buffer 220 in relation to the buffer 200 after parts 110, 112, 114, and 116 have been performed for each section 202, according to an embodiment of the invention. The section 202A includes m characters 204A, 204B, 204C, 204D, 204E, . . . , 204M, where m is greater than or equal to six. Similarly, the section 202B includes m characters 206A, 206B, 206C, 206D, 206E, . . . , 206M; and, the section 202M includes m characters 208A, 208B, 208C, 208D, 208E, . . . , 208M.

The ring buffer 220 includes n elements 222A, 222B, 222C, . . . , 222N, collectively referred to as the elements 222, where n is the number of sections 202 within the buffer 200. Each element 222 can store a string of l characters, where a string of l characters is retrieved from each section 202 starting at the offset k into the section, where k is between zero and m−1. In the example of FIG. 2C, l is equal to four, k is equal to one, and as noted above, m is greater than or equal to six.

A string of four characters from the section 202A starting at the second character 204B is thus retrieved, which is the string of characters 204B, 204C, 204D, and 204E in that order. This string of characters is reordered, such as by reversing the order of the characters, which particularly results in the reordered string of characters 204E, 204D, 204C, and 204B in that order. This reordered string of characters is stored in the current (and first) element 222A of the ring buffer 220, and the ring buffer 220 is rotated so that the current element is the next element 222B.

A string of four characters from the section 202B starting at the second character 206B is then retrieved, which is the string of characters 206B, 206C, 206D, and 206E in that order. This string of characters is reordered, such as by reversing the order of the characters, which particularly results in the reordered string of characters 206E, 206D, 206C, and 206B in that order. This reordered string of characters is stored in the current element 222B of the ring buffer 220, and the ring buffer is rotated so that the current element is the next element 222C.

This process is repeated for each remaining section 202 of the buffer. Therefore, for the last section 202N, a string of four characters starting at the second character 208B is retrieved, which is the string of characters 208B, 208C, 208D, and 208E in that order. This string of characters is reordered, such as by reversing the order of the characters, which particularly results in the reordered string of characters 208E, 208D, 208C, and 208B in that order. This reordered string of characters is stored in the current (and last) element 222N of the ring buffer 220, and the ring buffer is rotated so that the current element becomes the first element 222A again.

Referring back to FIG. 1, the following is then performed for each section (120). The ring buffer is rotated to change the current element (122), such as by moving the current element to the next element within the ring buffer. The string of characters within the section that was previously retrieved in part 110 is copied over in the buffer with the reordered string of characters from the current element of the ring buffer (124). That is, the string of characters within the section that was previously retrieved in part 110 is copied over in the buffer with the reordered string of characters for a different buffer. The reordered string of characters for each section is copied to just one other section of the buffer.

Figure 2D:
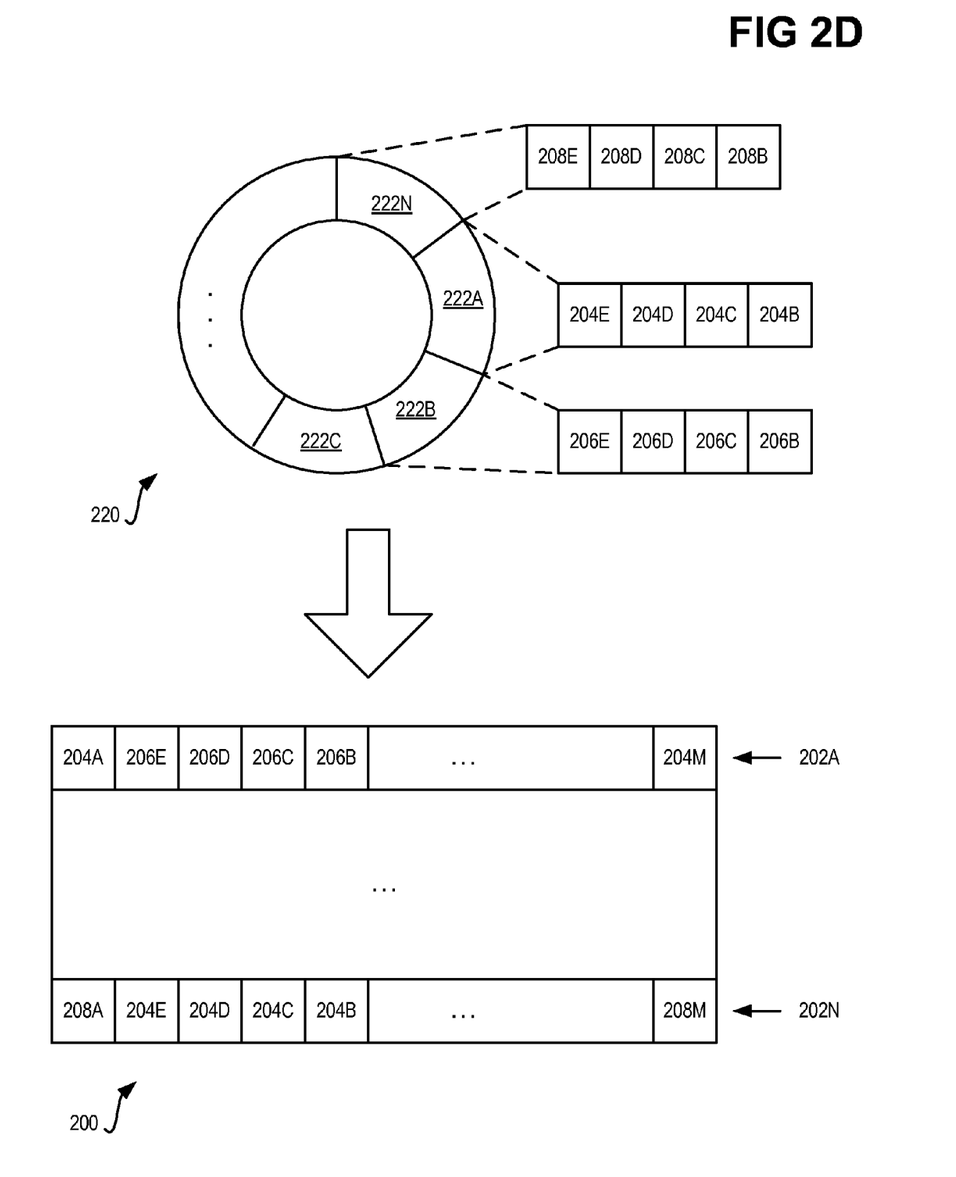

FIG. 2D shows the buffer 200 after parts 122 and 124 have been performed for each section 202 in relation to the ring buffer 220, according to an embodiment of the invention. Just the sections 202A and 202N of the buffer 200 are depicted in FIG. 2D. That is, the section 202B is not depicted in FIG. 2D.

After part 116 has been performed for the last section 202N, the current element of the ring buffer 220 is the first element 222A. Therefore, when part 122 is performed for the first section 202A, the ring buffer 220 is rotated so that the current element becomes the next element 222B. The reordered string of characters previously stored in this current element 222B, which includes the characters 206E, 206D, 206C, and 206B in that order, is copied to the section 202A, over the string of characters 204B, 204C, 204D, and 204E in that order. As depicted in FIG. 2D, then, the section 202A now includes the characters 204A, 206E, 206D, 206C, 206B, 206A, ..., 204M in that order. As such, the string of the second through fifth characters of the section 202B has been reversed in order and copied over the second through fifth characters of the section 202A.

This process is repeated for each remaining section 202 of the buffer. When part 122 is performed for the last section 202N, the ring buffer 220 is rotated such that the current element becomes the first element 222A again. The reordered string of characters previously stored in this current element 222A, which includes the characters 204E, 204D, 204C, and 204B in that order, is copied to the section 202N, over the string of characters 208B, 208C, 208D, and 208E in that order. As depicted in FIG. 2D, then, the section 202N now includes the characters 208A, 204E, 204D, 204C, 204B, ..., 208M in that order. As such, the string of the second through fifth characters of the section 202A has been reversed in order and copied over the second through fifth characters of the section 202N.

Referring back to FIG. 1, the buffer is output to a file (126). The first time part 126 is performed, the file may be created to include just the contents of the buffer. Any successive time part 126 is performed in relation to this file, the contents of the buffer are appended to the file. If the file has reached a desired length (128), then the file is used to test a single-instance storage algorithm and a data compression algorithm (132). However, if the file is still shorter than the desired length (128), then the method 100 is repeated at part 106 or part 126. When the method 100 is repeated at part 106, the offset is determined by simply changing the previously determined offset. For example, the offset may be incremented by one, and if the offset becomes greater than m−l, where m is the number of characters in each section and l is the number of characters in each string, then the offset may be reset to zero.

In one embodiment, whether the method 100 is repeated at part 106 or part 126 is determined based on the desired amount of duplicate data to be included within the file. This determination may be made in a number of different ways. For example, it may be decided to alter the contents of the buffer five times in order to achieve the desired amount of duplicate data within the file. If the desired length of the file is ten times the size of the buffer, then each time parts 108 and 120 are performed, the buffer is output to the file twice, so that the buffer is ultimately output to the file a total of ten times. As such, after each time part 120 is performed, the method 100 proceeds in part 130 to part 126 one time before then proceeding in part 130 to part 106.

Figure 2E:
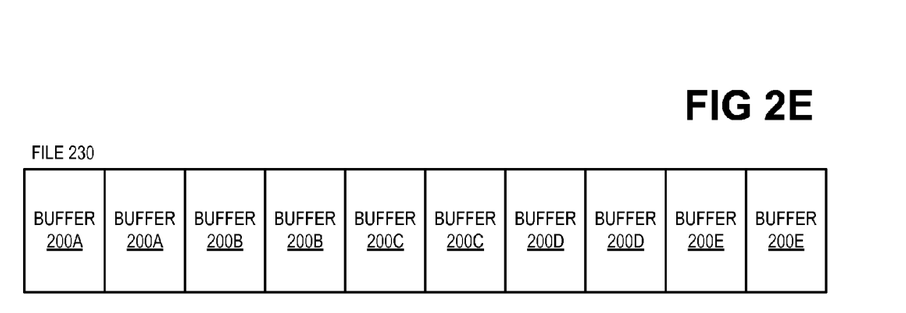

FIG. 2E shows an example file 230 after the method 100 has been performed, according to an embodiment of the invention. Different versions of the buffer 200 are specified as the buffer versions 200A, 200B, 200C, 200D, and 200E in FIG. 2E. Each version of the buffer results from performing parts 106-122 of the method 100. Specifically, when the method 100 is performed for the first time, the version 200A of the buffer 200 is created by performing parts 106-122, after parts 102 and 104 have been performed for the first time. This version 200A is output to the file 230 twice by performing part 126 twice. When the method 100 is performed for the second time, the version 200B of the buffer 200 is created by again performing parts 106-122. This version 200B is also output to the file 230 twice by performing part 126 twice. This process continues for the versions 200C, 200D, and 200E, such that each of the versions 200C, 200D, and 200E is output to the file 230 twice.

The method 100 can be repeated to generate each file that is to be used to test a single-instance storage algorithm. In one embodiment, when a given file has reached its desired length in part 128, the method 100 is performed starting at 102 for the next file. However, in another embodiment, when a given file has reached its desired length in part 128, the method 100 continues, but in relation to the next file. Thus, after performing part 128, the method 100 proceeds in part 130 back to part 106 or part 126, but in relation to and for the next file.

It is noted that the method 100 results in a file that can be used to test a single-instance storage algorithm in part 132 because the file has sufficient duplication of data. The file is an artificially generated file, in that it does not include real-world data representing text, spreadsheets, images, presentations, and so on, but rather includes data that is generated for the sole purpose of testing an algorithm. Nevertheless, the file mimics a non-artificially generated file that does include real-world data representing text, spreadsheets, images, presentations, and so on, insofar as the file can be used to effectively test a single-instance storage algorithm in lieu of using a non-artificially generated file.

The developer of a single-instance storage algorithm desirably tests the algorithm before using the algorithm to deduplicate real-world data provided by customers and other users. However, the users may be loathe to provide their data to the developer for such testing purposes, because the data may include confidential information. In this respect, the file that is artificially generated by the method 100 mimics a non-artificially generated file that contains such real-world data with respect to testing a single-instance storage algorithm. That is, the file generated by the method 100 has been found to yield testing results for single-instance storage algorithms that are comparable to testing results that are yielded when using non-artificially generated files that contain real-world data.

Testing the single-instance storage algorithm typically includes detecting one or more repeating patterns of data within a file, where the repeating patterns of data are commonly referred to as blocks or chunks. For a given repeating pattern of data, just one copy of the repeating pattern is stored within the file. All other copies of the repeating pattern are each replaced within the file by a reference to the copy of the repeating pattern that is stored within the file. In this way, a single-instance storage algorithm maximizes available storage space. Duplicate blocks of data within a file are deduplicated in that just one copy of the block is stored, and other copies of the block are replaced by references to this copy.

It is further noted that the method 100 results in a file that can be used to test a compression algorithm in part 132 along with the single-instance storage algorithm. The generated file does not greatly affect data compression as compared to the original source file used to generate the file in the method 100, and in this respect mimics non-artificially generated files that contain real-world data. The generated filed does not affect data compression because the data within the file originates from the same source file. That is, the source file can be originally generated so that it can be compressed by a given amount, and thereafter the file that is generated by the method 100 using this source file will generally be able to be compressed by the same amount. A data compression algorithm can thus be tested at the same time as the single-instance storage algorithm is tested, using the same generated file.

By comparison, this is generally not possible with a file resulting from use of conventional random data generation techniques. Since such techniques essentially generate random data, the resulting file of this random data is typically unable to be used to test both a single-instance storage algorithm and a data compression algorithm at the same time. This is because the nature of the randomization process inherently precludes controlling the generation of the data in a way in which a data compression algorithm can then be effectively tested alongside a single-instance storage algorithm. That is, random data cannot typically be generated in such a way to guarantee that it can be compressed by a desired amount.

Figure 3:
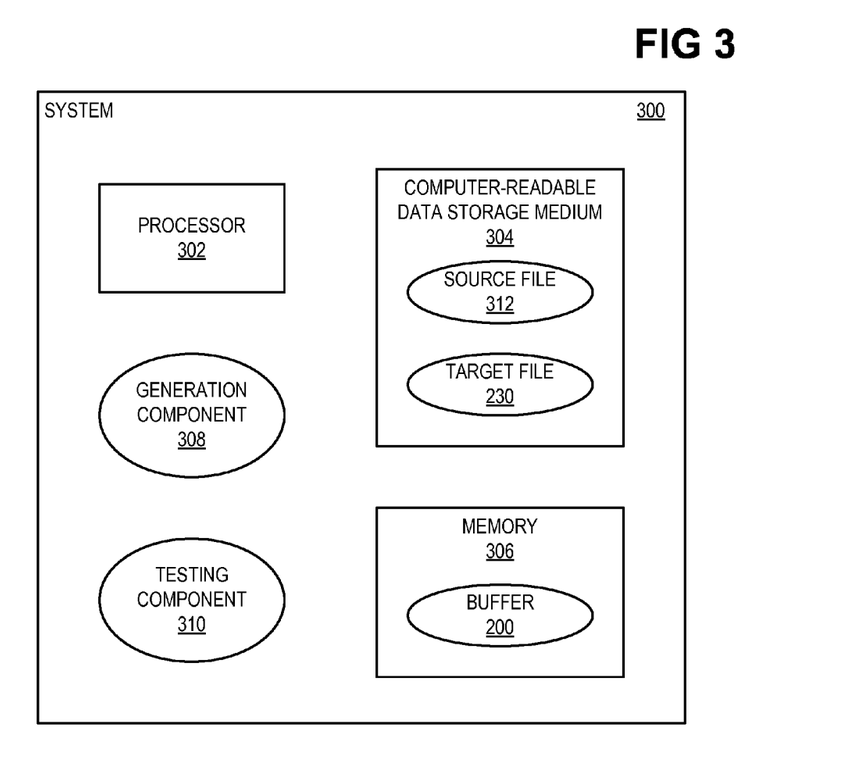
FIG. 3 is a diagram of a representative system, according to an embodiment of the invention.

FIG. 3 shows a representative system 300, according to an embodiment of the invention. The system 300 can be implemented over one or more computing devices. The system 300 includes a processor 302, a computer-readable data storage medium 304, a memory 306, a generation component 308, and a testing component 310. The computer-readable data storage medium 304 may be a non-volatile data storage medium such as a hard disk drive. The memory 306 may be a volatile semiconductor memory. The components 308 and 310 are implemented by the processor 302. For example, the components 308 and 310 may each be or include one or more computer programs stored on the computer-readable data storage medium 304 and/or the memory 306 and that are executed by the processor 302.

The computer-readable data storage medium 304 stores a source file 312 and the target file 230. The memory 306 includes the buffer 200. The source file 312 contains the data from which the buffer 200 may be initially populated. The generation component 308 generates the target file 230 from the buffer 200, such as by performing the method 100. Once the target file 230 has been generated, the testing component 310 can then use the file 230 to test a single-instance storage algorithm, such as in a conventional or other manner.

As can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

I claim:

1. A method comprising:
for each section of a plurality of sections of a buffer,
retrieving a string of characters from the section, by a computing device;
reordering characters within the string of characters, by the computing device, to generate a reordered string of characters for the section;
for each section of the plurality of sections of the buffer,
copying over the string of characters within the section with the reordered string of characters for a different section of the plurality of sections, by the computing device;
outputting the buffer to a file, the file adapted to mimic a non-artificially generated file in relation to testing a single-instance storage algorithm; and,
testing the single-instance storage algorithm using the file by detecting a repeating pattern of data within the file, such that just one copy of the repeating pattern is stored within the file and other copies of the repeating pattern are each replaced within the file by a reference to the one copy of the repeating pattern stored within the file.

2. The method of claim 1, wherein the file is further adapted to mimic the non-artificially generated file in relation to testing a data compression algorithm, and wherein the method further comprises testing the data compression algorithm using the file.

3. The method of claim 1, wherein the file is a target file, and wherein the method further comprises filling the buffer from a source file.

4. The method of claim 1, further comprising dividing the buffer into the plurality of sections.

5. The method of claim 1, further comprising, after outputting the buffer to the file, and in response to determining that a desired length of the file has not yet been reached, performing one of repeating the method and outputting the buffer to the file again, based on a desired amount of duplicate data to be included within the file.

6. The method of claim 1, wherein the strings of characters retrieved from the sections and reordered are equal in length.

7. The method of claim 1, wherein a length of the string of characters retrieved from each section is less than a length of the section.

8. The method of claim 1, wherein reordering the characters within the string of characters comprises reversing an order of the characters within the string of characters.

9. The method of claim 1, further comprising, after reordering the characters within the string of characters to generate the reordered string of characters for the section,
copying the reordered string of characters to a current element of a ring buffer; and,
rotating the ring buffer to change the current element of the ring buffer.

10. The method of claim 9, further comprising, before copying over the string of characters within the section with the reordered string of characters for a different section, rotating the ring buffer to change the current element of the ring buffer,
wherein copying over the string of characters within the section with the reordered string of characters for a different section comprises copying the reordered string of characters from the current element of the ring buffer.

11. The method of claim 1, wherein the reordered string of characters for each section is copied to just one other section of the buffer.

12. A method comprising:
for each section of a plurality of sections of a buffer,
retrieving a string of characters from the section, by a computing device;
reordering characters within the string of characters, by the computing device, to generate a reordered string of characters for the section;
for each section of the plurality of sections of the buffer,
copying over the string of characters within the section with the reordered string of characters for a different section of the plurality of sections, by the computing device;
outputting the buffer to a file, the file adapted to mimic a non-artificially generated file in relation to testing a single-instance storage algorithm;
testing the single-instance storage algorithm using the file;
determining an offset; and,
incrementing the offset before each of one or more times the method is repeated,
wherein retrieving the string of characters from the section comprises retrieving the string of characters starting at a number of characters into the section equal to the offset.

13. A system comprising:
a processor;
a computer-readable data storage medium to store a file;
a memory including a buffer having a plurality of a plurality of sections;
a component implemented by the processor to generate the file by:
for each section of the buffer,
retrieving a string of characters from the section;
reordering characters within the string of characters to generate a reordered string of characters for the section;
for each section of the buffer,
copying over the string of characters within the section with the reordered string of characters for a different section of the buffer;
outputting the buffer to a file, the file adapted to mimic a non-artificially generated file in relation to testing a single-instance storage algorithm;
a testing component to test the single-instance storage algorithm by using the file,
wherein the component is further to generate the file by determining an offset, such that retrieving the string of characters from the section comprises retrieving the string of characters starting at a number of characters into the section equal to the offset.

14. The system of claim 13, wherein the testing component is to detect a repeating pattern of data within the file, such that just one copy of the repeating pattern is stored within the file and other copies of the repeating pattern are replaced by a reference to the one copy of the repeating pattern.

15. The system of claim 13, wherein the component is further to generate the file by: after recording the characters within the string of characters to generate the reordered string of characters for the section,
copying the reordered string of characters to a current element of a ring buffer;
rotating the ring buffer to change the current element of the ring buffer,
before copying over the string of characters within the section with the reordered string of characters for a different section,
rotating the ring buffer to change the current element of the ring buffer,
wherein copying over the string of characters within the section with the reordered string of characters for a different section comprises copying the reordered string of characters from the current element of the ring buffer.

16. The system of claim 13, wherein the strings of characters retrieved from the sections and reordered are equal in length.

17. The system of claim 13, wherein a length of the string of characters retrieved from each section is less than a length of the section.

* * * * *